United States Patent [19]

Terbrack

[11] Patent Number: 4,542,330
[45] Date of Patent: Sep. 17, 1985

[54] LOW INPUT VOLTAGE PRECISION DC-TO-DC VOLTAGE CONVERTER CIRCUIT

[75] Inventor: William H. Terbrack, Irvine, Calif.

[73] Assignee: Hughes Aircraft Company, Culver City, Calif.

[21] Appl. No.: 538,739

[22] Filed: Oct. 4, 1983

[51] Int. Cl.[4] ............................................. G05F 1/46
[52] U.S. Cl. .................................... 323/222; 323/901
[58] Field of Search ........................... 363/19, 21, 49; 323/222, 901

[56] References Cited

U.S. PATENT DOCUMENTS 3,909,696 9/1975 Katou et al. ........................... 363/21
4,261,032 4/1981 Cavigelli ............................... 363/19

FOREIGN PATENT DOCUMENTS

0041720 4/1978 Japan ..................................... 363/21
0615466 6/1978 U.S.S.R. ................................ 363/19

Primary Examiner—Peter S. Wong
Assistant Examiner—Judson H. Jones
Attorney, Agent, or Firm—Joseph E. Szabo; Anthony W. Karambelas

[57] ABSTRACT

A DC-to-DC up-converter of the type wherein voltage is built up across a capacitor by alternately connecting a coil by means of a pulse width modulator-controlled switching transistor across a low DC voltage source and, in series with that source, across the capacitor. Operation is initiated by converting the switching circuit into a blocking oscillator, running the oscillator from the low DC voltage source, and using the up-converted voltage to power the rest of the up-converter, making it possible to run the entire up-converter circuit from a very low voltage source.

3 Claims, 19 Drawing Figures

LOW INPUT VOLTAGE PRECISION DC-TO-DC VOLTAGE CONVERTER CIRCUIT

BACKGROUND OF THE INVENTION

1. Field of the Invention

The subject invention relates generally to voltage multiplying circuits and, more particularly, to DC-to-DC voltage multipliers of the type wherein an energy-storing coil is alternately connected across a DC voltage source and, in series with the voltage source, across a storage capacitor.

2. Description of the Prior Art

Portable electronic equipment almost universally employs battery powered transistor circuits. Most such circuits require for their operation a supply voltage level higher than that produced by a conventional battery cell whose output toward the end of its life can drop to as low as 0.9 volts. Consequently, several battery cells must usually be connected in series to operate such transistor circuits, resulting in increased complexity and, hence, cost.

Circuits are available for converting a poorly regulated, low level DC voltage to a closely regulated DC voltage at a higher level, a process called "DC-to-DC up-conversion". Such circuits are limited by the voltages at which they can operate. None are known to operate from a single battery cell, particularly not when the output voltage of that cell has dropped due to use or age, or both, to a level significantly below 1.5 volts.

One type of circuit used for DC-to-DC up-conversion includes a coil which is alternately connected by means of an electronic control circuit across a source of DC potential and in series with that source across an output capacitor, thereby generating across the capacitor a voltage which, through a number of cycles, is built up to a higher level than that of the DC potential source. Such a voltage converter circuit usually includes a transistor switching circuit to make the alternate connection of the coil across the source of DC potential and to the output capacitor. In addition, the circuit includes a pulse width modulator for driving the switching circuit and an oscillator for driving the pulse width modulator. The control circuit operates by modulating the duty cycle of the pulse width modulator in response to the voltage across the output capacitor, thereby regulating the duration of the time periods during which the switched coil is connected to discharge its energy into the output capacitor. In this way, the voltage across the output capacitor can be maintained quite precisely.

A shortcoming of the above type of converter circuit is that its operating voltage is usually derived from the DC source whose level is to be stepped up through operation of the circuit. Since such circuits require, for their operation, a voltage which corresponds to the output of several battery cells connected in series, they cannot be used to step up the voltage of a single battery cell.

Accordingly, it is a principal object of the present invention to provide a circuit capable of converting the output of a single battery cell to a stable voltage at a level which is a multiple of the battery cell's output voltage.

A related object of the present invention is to provide a voltage regulating circuit capable of operating from extremely low voltage levels.

A more specific object of the present invention is to modify currently available voltage regulating up-converters so as to reduce the voltage they require for their operation.

SUMMARY OF THE INVENTION

In accordance with the present invention, these and other objects are attained by providing a DC-to-DC converter of the type wherein a coil is alternately connected by means of an electronic switching circuit first across a source of DC potential and then in series with that source across an output capacitor, wherein the improvement comprises a blocking oscillator capable of operating at a very low DC potential and serving to initiate operation of the DC-to-DC converter by building up, through successive cycles of its operation, the voltage across the output capacitor and using that voltage to operate the remainder of the DC-to-DC converter. More particularly, the blocking oscillator is formed of the periodically switched coil and a second coil which is electromagnetically coupled thereto and electrically connected to the electronic switching circuit. The two coils are connected so as to form a feedback loop from the output of the switching circuit to its input, thereby converting it into a blocking oscillator which breaks into oscillation as soon as the potential of the single battery cell is applied thereto. Within a few cycles of operation, the oscillator has switched the first coil a sufficient number of times to build up the voltage across the output capacitor to the level where that voltage is sufficient to operate the conventional components of the up-converter circuitry, which include an oscillator and pulse width modulator. Once this takes place, periodic switching of the switching circuit, and hence of the first coil, is assumed by the conventional control circuit component.

BRIEF DESCRIPTION OF THE DRAWINGS

FIGS. 3a and 3b are equivalent circuits of the voltage regulator of FIG. 1 showing the current flow therein with the switching transistor turned on.

FIGS. 4a, b and c are waveforms of voltages in the FIG. 1 circuit.

Figure 1:
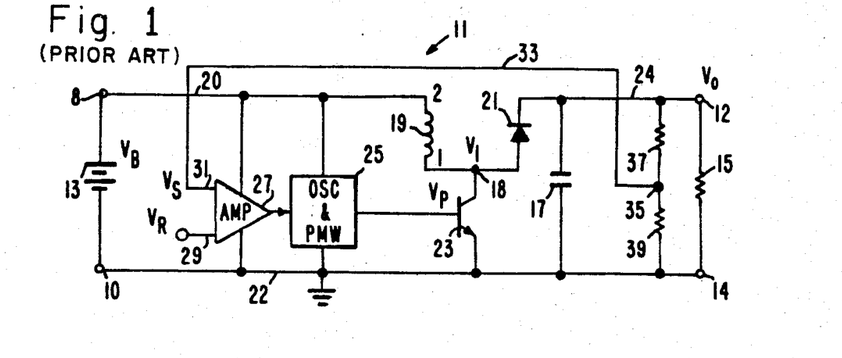
FIG. 1 is a block diagram of a conventional step-up voltage regulator.
Figure 3A:
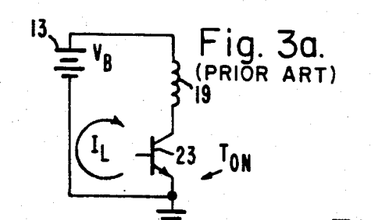
Figure 3B:
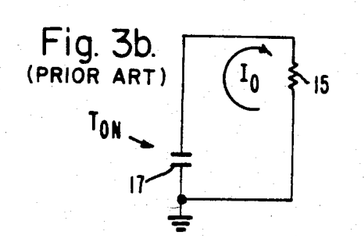

An exemplary step-up voltage regulator, on which the present invention is an improvement, is illustrated in FIG. 1 as the circuit 11. It includes a pair of input terminals 8 and 10 to which a battery 13 is connected and a pair of output terminals 12 and 14 across which a load resistor 15 is connected. The purpose of the circuit 11 is to step up, or boost, the voltage of the battery 13 to a higher level, $V_O$ appearing across the output terminals 12 and 14. Toward this end, a capacitor 17 is connected across the output terminals 12 and 14 by a line 24 connected to the output terminal 12 and a line 22 connecting the input terminal 10 and the output terminal 14 to ground. A coil 19 is connected through a transistor 23 across the battery 13 through a line 20 connected to the input terminal 8 and through aforementioned ground line 22 connected to the terminal 10. The point, or node, 18, where the switching transistor 23 joins the coil 19, is connected through a diode 21 to the line 24. In this manner, the coil 19 is switchable between two configurations by turning the switching transistor 23 "on" and "off". When the switching transistor 23 is "on", it connects the point 18 to the ground line 22 and, hence, the coil 19 essentially across the battery 13. At the same time, the diode 21 becomes reverse biased because its anode is connected to ground. As a result, there is essentially an open circuit between the point 18 and the line 24. This mode of operation is illustrated in FIGS. 3a and 3b. In FIG. 3a, current $I_L$ is shown to circulate through the battery 13 to coil 19 and the closed transistor 23. In FIG. 3b, current $I_O$ is shown to be discharged from the capacitor 17 through the load resistor 15.

Figure 2:
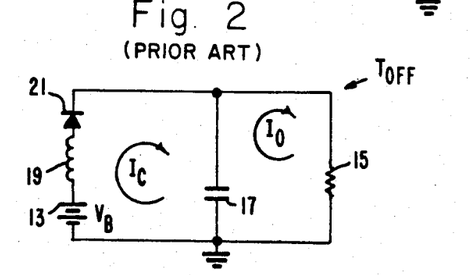
FIG. 2 is an equivalent circuit of the voltage regulator of FIG. 1 showing current flow therein with its switching transistor turned off.

The second state, which the FIG. 1 circuit may assume, as illustrated in FIG. 2 and is maintained when the switching transistor 23 is turned "off" so that its current path is open. When the circuit is in this condition, a connection is established from the positive terminal of the battery 13 through the input terminal 8, line 20, coil 19 and the diode 21 to the line 24 and the output terminal 12. The diode 21 is now biased "on" because its anode, connected to point 18, is no longer grounded but is instead maintained at a potential more positive than that of its cathode. A current $I_C$ therefore circulates from the battery 13 through the coil 19 and the diode 21 through the capacitor 17 and the load resistor 15, which are connected in parallel across the lines 24 and 22. It may be seen that, by alternately closing and opening the switching transistor 23, energy is stored in the coil 19 and then applied to the capacitor 17 so as to build up the voltage applied to the lines 24 and 22 to a level $V_O$ which is greater than the voltage applied by the battery 13 across the input terminals 8 and 10.

Figure 4:
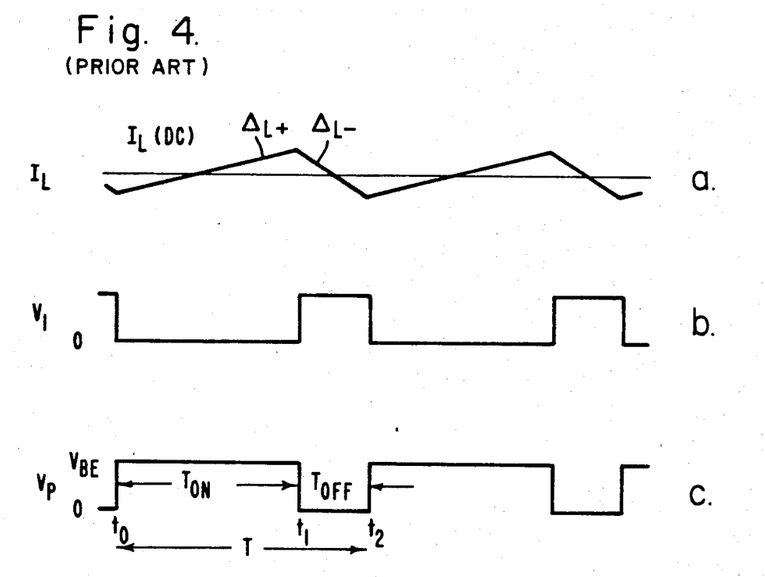

The task of alternately closing and opening the transistor 23 is accomplished by an oscillator and pulse width modulating circuit 25 whose output is connected to the base of the transistor 23 and whose input receives a control signal from an amplifier 27 which compares voltages which are applied to its input terminals 29 and 31. The voltage applied to the amplifier terminal 31 is applied thereto over a line 33 from a tap 35 between a pair of voltage divider resistors 37 and 39, which are connected in series across the lines 24 and 22. This voltage $V_S$ is some fraction of the voltage $V_O$; the fraction being determined by the ratio of the resistors 37 and 39. The oscillator and pulse width modulator circuit 25 is adjusted so that when the voltage $V_S$ on amplifier input terminal 31 matches the voltage $V_R$, a reference voltage applied to the amplifier input terminal 29, the ratio of the time during which the switching transistor 23 is kept "on" on the time when it is switched "off" will maintain the output voltage $V_O$ at a predetermined level. This is best illustrated in FIGS. 4a, b, and c which respectively show the current $I_L$ in the coil 19, the voltage $V_1$ at the point 18, and the voltage $V_P$ at the output of the oscillator and pulse width modulating circuit 25. The output $V_P$ of the circuit 25 is an asymmetrical square waveform having a period T. During the first portion of the cycle T, shown to occur between times $t_0$ and $t_1$, the voltage $V_P$ is at a level which is positive relative to ground and is designated $T_{ON}$, indicating that the switching transistor 23 has been turned "on". During the final part of the period T, shown to occur between times $t_1$ and $t_2$, the voltage $V_P$ is at ground level and is designated with the label $T_{OFF}$, during which time the transistor 23 is switched "off".

Corresponding to the voltage $V_P$, illustrated in FIG. 4c, the voltage $V_1$, illustrated in FIG. 4b, is periodically switched to ground so that the voltage $V_1$ is at ground level during the period $T_{ON}$ and is at a substantially higher level than $V_B$ during the period $T_{OFF}$. As a result, coil current $I_L$ flows from the battery $V_B$ into the coil 19 during the period $T_{ON}$ and flows out of the coil and into the capacitor during the period $T_{OFF}$. The coil current has a DC component labeled IL(DC) and a variable component labeled $\Delta L+$ during the period $T_{ON}$ and labeled $\Delta L-$ during the period $T_{OFF}$. The time $T_{ON}$, during which the variable component $\Delta L+$ prevails, is called the "dwell time" of the coil during which it receives energy; whereas the time during which the coil current component $\Delta L-$ prevails, is called the "discharge time" during which the coil discharges energy into the capacitor 17. It is well known that the relation between the voltage $V_O$, across terminals 12 and 14, and the battery voltage $V_B$, across the input terminals 8 and 10, is expressed by the following equation:

$$V_O \simeq V_B \left(1 + \frac{T_{ON}}{T_{OFF}}\right)$$

The FIG. 1 circuit reaches an equilibrim condition when $V_S = V_R$, since for any other condition, a voltage will appear at the output of the amplifier 27. Consequently, it can be shown that the relation between the output voltage $V_O$ and the reference voltage $V_R$ is expressed by the equation:

$$V_O = V_R \left(1 + \frac{R_{37}}{R_{39}}\right)$$

In summary, the FIG. 1 circuit serves to increase the voltage applied to its input terminals 8 and 10 by operation of the switching transistor 23 and to maintain the output voltage $V_O$ at some constant level by operation of the amplifier 27 and the oscillator and pulse width modulator circuit 25.

Figure 5:
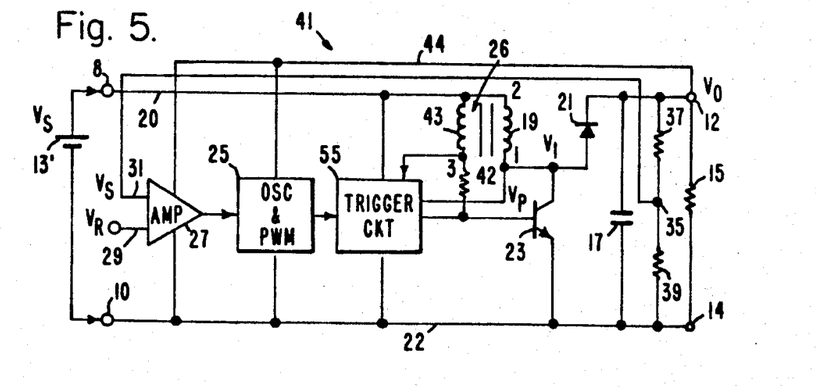
FIG. 5 is a block diagram of an improved voltage regulator in accordance with the present invention.

In the above-described circuit, which is conventional, the amplifier 27 and oscillator and pulse width modulator 25 are both powered from the battery 13 over the lines 20 and 22. This represents an undesirable limitation on the operation of the circuit because the lowest battery voltage with which the circuit can be used is dictated by the minimum operating voltage requirement of the circuits 25 and 27. This minimum voltage requirement has, until now, implied the use of a multicell battery 13. In keeping with the present invention, means are provided to enable such a circuit to operate from a single cell battery, even when the output voltage of that battery is significantly below its nominal 1.5 volt output. Such a circuit is illustrated in FIG. 5.

It is similar to the FIG. 1 circuit but differs therefrom in several important respects. Firstly, a second coil 43, coupled to the first coil 19 is added, the two coils being parts of a common transformer 26. The second coil 43 is connected at tap 2 to the first coil 19 and at tap 3 to a feedback resistor 42 and to an input of a trigger circuit 55. The feedback resistor 42 is connected to the base of transistor 23. The trigger circuit 55 is powered by the battery 13 through lines 20 and 22, receives a triggering input from the circuit 25 and provides a triggering output, in response to either one of its inputs, to the base of transistor 23.

By means of the feedback connection established through the coils 19 and 43, the resistor 42 and the trigger circuit 55, the switching transistor 23 is converted into a blocking oscillator so that when power is first applied to the circuit 41 from the battery 13', which is shown as having a single cell, that voltage, although not sufficient to activate the circuits 25 and 27, is capable of powering the blocking oscillator comprised of the transistor 23 and the coils 19 and 43. By operation of that blocking oscillator, within a few cycles the voltage across the output terminals 12 and 14 builds up to a sufficient level to activate the circuits 25 and 27 which, instead of being powered directly from the battery 13, as in FIG. 1, are connected across the output terminals 12 and 14, thus receiving a boosted voltage therefrom. The circuits 25 and 27, in turn, take over the voltage boosting function from the start-up circuit comprising the blocking oscillator to produce a well regulated output voltage across the output terminals 12 and 14. Thus, while the output voltage which initially appears across the terminals 12 and 14 may not be sufficiently well regulated to meet the steady state demands placed upon the circuit, it is sufficiently high to initiate operation of the circuits 25 and 27; and through them, to start up and run the entire circuit 41.

As seen by the coil 19 and the diode 21, the switching transistor 23 functions in the same manner during the initial start-up period, when it is switched as part of the blocking oscillator, as it does thereafter when it is switched under the control of the oscillator and pulse width modulator 25. That is, the switching transistor 23 is alternately turned "on" and "off" so as to effectuate the circuits shown in FIGS. 2, 3a and 3b, thereby boosting the voltage across the capacitor 17 and, hence, across the output terminals 12 and 14. However, the frequency with which the transistor 23 is switched during the starting period is only about half that with which it is switched after its control is assumed by the oscillator and pulse width modulating circuit 25.

Figure 7:
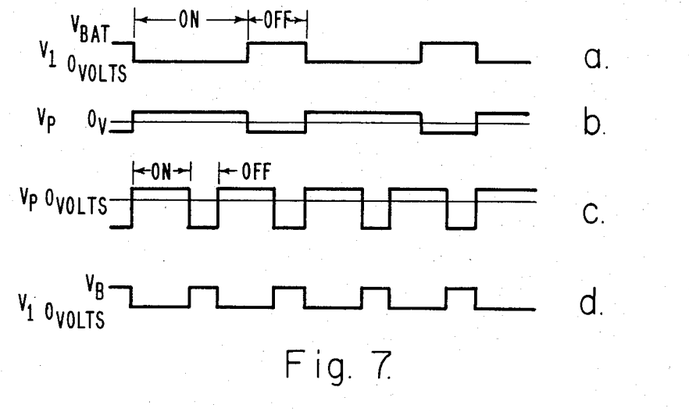
FIGS. 7a through d are waveforms illustrating the variation of voltages with time in the circuit illustrated in FIG. 5.

The voltage levels prevailing at the collector and base of the switching transistor 23 during start-up are shown in FIGS. 7a and b, respectively. These voltages result from operation of the blocking oscillator formed by the switching transistor 23 and the transformer coils 19 and 43 along with the feedback resistor 42 in the following manner. When $V_B$, from the battery 13', is first applied to the circuit, it is turned "on" by virtue of the voltages applied to its collector and base through terminals 1 and 3 of the transformer comprised of the coils 19 and 43. As a result, the transistor 23 connects terminal 1 of the coil 19 to ground through the line 22, drawing current through the coil 19 from the battery, until the transistor 23 is cut off, which occurs when the core of the transformer 26 becomes saturated. This marks the end of the ON period in FIG. 7a and the beginning of the OFF period. With the transistor 23 being cut off and the diode 21 biased "on", terminal 1 of the coil 19 is connected to the capacitor 17, discharging the energy stored in the coil into the capacitor. Moreover the capacitor 17 receives the sum of the voltages which appear across the battery 13' and the coil 19. The circuit continues in this state until the transistor 23 turns "on" again, which occurs when the energy that had been stored in the coil 19 has been transferred into the capacitor 17. At that point, current ceases to flow through the coil 19, causing the voltage at its terminal 1 to fall, and by transformer action, the voltage at its terminal 3 to rise, turning the transistor 23 on.

The start-up mode of operation illustrated in FIGS. 7a and 7b continues for a number of cycles until the voltage across capacitor 17 builds up to a sufficient level so that when it is applied over the line 44 to the circuits 25 and 27, they can begin to operate and assume control of the transistor 23. When that occurs, the operation of the circuit will be that which is reflected by FIGS. 7c and 7d. They show that the frequency with which the transistor 23 is switched "on" and "off" is approximately twice that which prevailed during the start-up operation.

Figure 6:
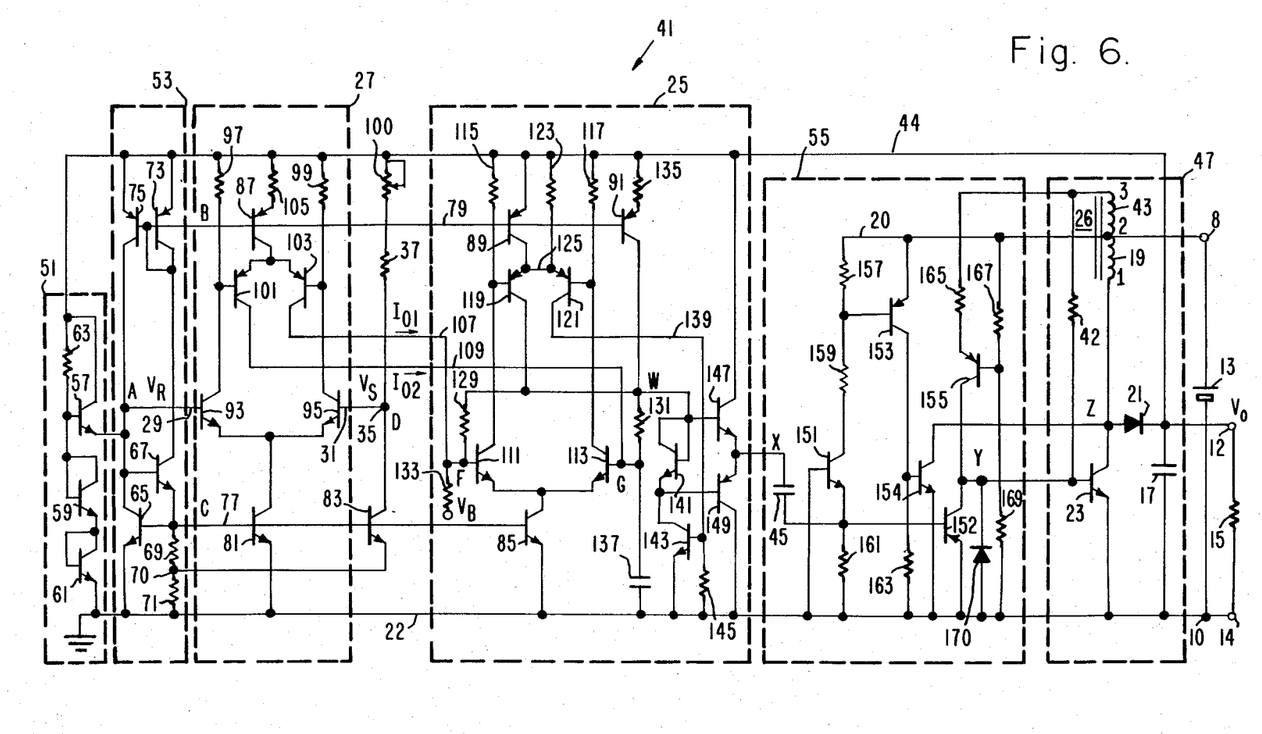
FIG. 6 is a schematic diagram of the FIG. 5 voltage regulator.

The circuit of FIG. 5 is illustrated in greater detail in the schematic diagram of FIG. 6. The input terminals 8 and 10, with the single cell battery 13' connected across them, is shown at the right hand extreme of FIG. 6, in contrast to FIG. 5 wherein they appear at the left extreme of the figure. The output terminals 12 and 14 are located right next to the input terminals 8 and 10 at the right hand side of the figure and are shown to emanate from the output circuit 47 which includes the switching transistor 23, the output capacitor 17, diode 21, the transformer 26 with its two coils 19 and 43 and the feedback resistor 42. To the immediate left of the output circuit 47 is the trigger circuit 55 which includes a number of components not shown in FIG. 5 and whose function, as will be described later, is to turn the switching transistor 23 "on" and "off" in response to voltages generated in the transformer 26 and also in response to the oscillator and pulse width modulator, which is shown in detail in the block 25 in FIG. 6. Shown to the left of the oscillator and pulse width modulating circuit 25 is the sense amplifier 27 which receives one of its input voltages $V_S$ on its input 31 from the point 35 between the blocks 27 and 25, and the other of its input voltages $V_R$ on its input 29 connected to receive the reference voltage $V_R$ produced by a reference voltage source 53, shown to the immediate left of the sense amplifier 27. Finally, the block left-most in FIG. 6 is a start-up circuit 51 which serves to provide the necessary operating current to the reference voltage source 53.

Turning now to the detailed description of the FIG. 6 circuit block-by-block, the start-up circuit 51 comprises a pair of transistors 59 and 61, having their emitter-collector paths connected in series with one another and with a resistor 63 across the lines 22 and 44, with the base of each transistor connected to its respective collector. A third transistor 57, having its base and collector respectively connected to opposite sides of resistor 63, completes the circuit. With the transistors 59 and 61 connected to function as diodes and the transistor 57 connected as a voltage follower, the start-up circuit 53 is operative to provide current through the emitter of transistor 57 to the current sources in the reference voltage source 53. These include a first transistor pair 65 and 67 and a second transistor pair 73 and 75. The transistor 67 has its base connected to the emitter of transistor 57; its emitter is connected through resistors 69 and 71 to the ground line 22; and its collector connected through the collector emitter circuit of the transistor 73 to the $V_O$ line 44. Conversely, the transistor 65 has its emitter-collector circuit connected in series with the collector-emitter circuit of the transistor 75 across the lines 22 and 44, while its base is connected to the emitter of transistor 67. Completing the circuit 53 is a connection between the bases of transistors pair 73 and 75 which, together, are connected to the collectors of the transistors 67 and 73.

The outputs of the circuit are taken from the nodes A and B, at the collector and base of transistors 75 and 73 respectively, and from node C at the emitter of transistor 67. The voltages on nodes A and C are kept at constant levels relative to the voltage on line 22, and the voltage on node B is kept at a constant level relative to the voltage on line 44. The voltage on node B is applied over line 79 to the bases of constant current source transistors 87, 89 and 91, and the voltage on node C is applied over line 77 to the bases of constant current source transistors 81, 83 and 85.

As noted before, the purpose of the reference of potential maintained at point A of circuit 53 is to be compared against a voltage derived from the output voltage $V_O$ so as to help maintain $V_O$ at a constant level. This is the function of the circuit 27 to the immediate right of the reference voltage source 53. It comprises a pair of PNP transistors 93 and 95 connected as a differential amplifier, with their emitters connected through the current source transistor 81 to the ground line 22 and their collectors connected individually through respective load resistors 97 and 99 to the $V_O$ line 44. A second differential amplifier, comprising a pair of PNP transistors 101 and 103, is connected so as to be controlled by the differential amplifier transistors 93 and 95; this being attained by individually connecting the collectors of the transistors 93 and 95, respectively, to the bases of the second differential amplifier pair 101 and 103. The emitters of the transistors 101 and 103, in turn, are connected jointly through the constant current source transistors 87 and current source resistor 105 to the $V_O$ line 44.

Current is provided to the first differential transistor pair 93 and 95 by the constant current source transistor 81, causing a voltage drop in their respective load resistors 97 and 99, which is applied to the bases of the second differential transistor pair 101 and 103, turning both of them "on". The extent of current conduction in the respective transistors 93 and 95 will be a function of the voltages applied to their bases at points A and D so that the degree of unbalance between the currents flowing through the two transistors will be a function of the difference in the voltages applied to their respective bases. This difference, in turn, is reflected in a difference between the currents $I_{O1}$ and $I_{O2}$ flowing through the second differential transistor pair 101 and 103, both of those currents being derived from the constant current source transistor 87. Thus, the currents delivered by the sense amplifier circuit 27 to points F and G in the oscillator and pulse width modulator circuit 25 will differ to an extent determined by the difference between the voltages $V_R$ and $V_S$ applied to points A and D at the inputs of the circuit 27. In a manner to be explained shortly, the difference between the currents delived to points F and G serves to bring about a corrective action in the oscillator and pulse width modulator circuit 25 whereby balance is restored between the voltages $V_R$ and $V_S$ on the bases of the sense amplifier transistors 93 and 95.

The voltage $V_S$ appearing at point D and applied to the base of transistor 95 is a function of the output $V_O$ which appears on the line 44 and is derived therefrom by means of a circuit which, in the simplified diagram of FIG. 5, was represented by the resistors 37 and 39. It comprises a variable resistor 100, the fixed resistor 37 and the constant current source transistor 83, all connected in series between $V_O$ line 44 and the point 70 connecting the resistors 69 and 71 in the start-up circuit 53. Since the current drawn by transistor 83 through resistors 37 and 100 is constant, so is the voltage drop across those resistors. As a result, the voltage at node D follows the voltage $V_O$ on line 44 precisely.

The oscillator and pulse width modulator includes a circuit very similar to that which forms the heart of the sense amplifier 27. This circuit comprises the current source transistor 85 connected to a first differential transistor pair 111 and 113, whose emitters are connected to the collector of the transistor 85 and whose collectors are connected through respective resistors 115 and 117 to the $V_O$ line 44. A second differential transistor pair 119 and 121 is connected so that their bases are directly coupled to the collectors of the respective transistors 111 and 113 and their emitters are connected to one another and, through the constant current source transistor 89, to the $V_O$ line 44. The current source transistor 89 is augmented by a resistor 123 shunted across it to add to the current supplied to the transistors 119 and 121.

The collector of transistor 119 is connected through a resistor 129 to the base of transistor 111 and through a resistor 131 to the base of transistor 113. The bases of transistors 111 and 113 are designated as points F and G repectively. Through a resistor 133, the base of transistor 111 is connected to the positive terminal 8 of the battery 13' so as to receive the biasing voltage $V_B$ therefrom. The base of transistor 113, on the other hand, is connected to one side of a timing capacitor 137 whose other side is connected to the ground line 22.

The timing capacitor 137 is a key component of the circuit 25. Transistors 89 and 119 provide a charge path through the base resistor 131 for the timing capacitor 137, while a discharge path for that capacitor is provided through the base resistor 131 and through a pair of transistors 141 and 143 which are connected in series between the collector of transistor 119, identified as the point W, and the ground line 22. The base of transistor 141 is connected to its collector directly, whereas a resistor 145 is connected between the base and emitter of transistor 143. An additional, constant current, path for charging the capacitor 137 through the resistor 131 is provided by the current source transistor 91, whose collector is connected to the point W and whose emitter is connected through the resistor 135 to the $V_O$ line 44. This current path provides a minimum value for the rate at which the capacitor 137 is charged.

The output of the oscillator and pulse width modulating circuit 25 is applied to the circuit 55 through a pair of output transistors 147 and 149 which are connected in series with one another across the ground and $V_O$ lines 22 and 44, with the base of transistor 149 being connected to the junction point of the emitter and collector of transistors 141 and 143, respectively, and the base of transistor 147 being connected at the node W to the collector and base of transistor 141. Consequently, the voltage, at node X, the point where the emitters of transistors 147 and 149 are joined, closely follows the voltage on the node W at the base of transistor 147.

The manner in which the circuit 25 operates will be best understood with reference to FIG. 6, as well as FIGS. 8a–f, which illustrate waveforms throughout the circuit and particularly at points F, G, W, Y, Z and at the output terminal 12. Assume that, through the initial operation of the blocking oscillator, which is yet to be explained in detail with reference to FIG. 6, a sufficient voltage has been built up across the lines 22 and 44 so that the circuits 51, 53, 27 and 25 can begin to operate. Assume, also, that the time is $t_0$ and that the voltages which prevail are those shown to exist at the time $t_0$ in FIGS. 8a–f. At time $t_0$, the charge on timing capacitor 137 will have dissipated to a minimum, as reflected by the level of the voltage at the point G shown in FIG. 8a. This state will have been reached due to the discharging of the capacitor 137 to the point (near ground) where the voltage at point G on the base of transistor 113 drops below that existing at point F on the base of transistor 111. At this instant ($t_0$), the transistor 113 is turned "off", which also turns "off" transistor 121, while transistors 111 and 119 are both turned "on". As a result, at $t_0$ the voltage at point G, the top plate of the timing capacitor 137, begins to rise, as the capacitor is being charged.

As a second consequence of transistor 119 turning "on" at $t_0$, the node W is rapidly pulled up toward $V_O$ and a source of additional charging current for capacitor 137 is established from constant current source transistor 89 through transistor 119 and point W. The rise at $t_0$ in the voltage at point W also causes a rise in the voltage at point F (see FIG. 8(b) at $t_0$).

Charging of the timing capacitor 137 continues until time $t_1$, when the voltage at point G reaches a positive level where it exceeds that being maintained at point F (see FIG. 8b) on the base of transistor 111. When that point is reached, shown as the time $t_1$ in FIG. 8, the state of conduction of transistors 111 and 113 is reversed so that transistor 113 is turned "on" and transistor 111 is turned "off". Cutting off transistor 111 turns "off" transistor 119, terminating the charge path therethrough and through the resistor 131 to the timing capacitor 137. Moreover, conduction through transistor 113 causes a voltage drop through resistor 117 which biases "on" the transistor 121, causing a current to flow from line 44 through resistor 123 and current source transistor 89, transistor 121 and through resistor 145 to the ground line 22, thereby applying a bias voltage to the transistor 143, turning it "on" which, in turn, causes conduction of transistor 141.

Thus, at time $t_1$, the voltage at point W is rapidly pulled back down to a level just above ground by conduction through transistors 141 and 143, this voltage being equal to the base-emitter voltage of the transistor 141. Due to the low voltage at point W, the capacitor 137 begins at time $t_1$ to discharge through the resistor 131, causing the voltage at point G to drop gradually as seen in FIG. 8a. Along with the drop of the point W at the top of the base resistor 129, the voltage at point F, on the base of transistor 111, also drops, as reflected by the waveform FIG. 8b at time $t_1$. This firmly cuts off the transistor 111. This condition, whereby the transistor 113 is maintained conducting while the transistor 111 is cut off, continues so long as the voltage at point G exceeds that at point F, which is seen to continue until $t_2$. At this time, transistors 111 and 113 revert to their original state (111 "on", 113 "off"), marking the end of the discharge cycle of the timing capacitor 137 and the beginning of its next charging cycle.

From what has been described so far, it may be seen that oscillator and pulse width modulating circuit 25 is operative to generate a series of pulses characterized in that the length of each pulse, as reflected by the time periods $t_0$-$t_1$ and $t_2$-$t_3$, is determined by the time taken to charge the timing capacitor 137, whereas the times between pulses, as reflected by the time period $t_1$-$t_2$, is determined by the time taken to discharge that capacitor.

Let it be assumed that a change in the output voltage $V_O$ results in an unbalance in the input voltages $V_S$ and $V_R$ to the sense amplifier 27 such that there occurs an increase in the sense amplifier output current $I_{O2}$ to the node G, increasing the current supplied to the timing capacitor 137 during its charging cycle. The additional charging current reduces the time it takes to charge the timing capacitor 137. The resulting waveforms are shown in FIGS. 8a–f, in dashed lines and reveal that the result is a shortening of the pulses during times $t_0$-$t_1$ and $t_2$-$t_3$, reflecting the shortened discharging time, and a lengthening of the coil dwell periods which intervene between such pulses. The effect of this shift (a gradual rise in $V_O$) will become apparent as this description next turns to the trigger circuit 55.

The principal function of the trigger circuit 55 is to provide a coupling between the node X, representing the output of the circuit 25, and the input of the output circuit 47, so as to turn the switching transistor 23 "on" and "off" under the control of the oscillator and pulse width modulating circuit 25. An additional function of the trigger circuit 55 is to help provide the necessary feedback circuitry to create, along with the components of the output circuit 47, the blocking oscillator which forms an important part of the invention. It should be noted at the outset is that, whereas the circuits 51, 53, 27 and 25 are powered by the output voltage $V_O$ through the power line 44, the transistors within the trigger circuit 55 are powered directly from the battery 13' over the power line 20.

The feedback function of the circuit 55 is performed by a feedback control transistor 155, connected in series with its associated resistor 165, the two being connected across, and in parallel with, the feedback resistor 42. A bias voltage is applied to the base of transistor 155 by a pair of bias resistors 167 and 169, connected across lines 22 and 20, with their junction being connected to the base of transistor 155 so as to provide it with a bias voltage somewhat lower than $V_B$ prevailing on the line 20.

To protect transistor 152 from excessive current during the "off" condition of transistor 23, its collector is kept from dropping below ground level by a diode 170 whose anode is connected to the ground line 22. To prevent excessive current from being drawn through the diode 170 by the resistor 42 during the "off" condition of transistor 23, the value of resistor 42 must not be too low. Consequently, in order to provide sufficient base current during the "on" condition of transistor 23, a switched, low-resistance current path, consisting of the resistor 165 and the transistor 155 are provided. Since the transistor 155 conducts only during the "on" period of transistor 23, the current drawn through the diode 170 during the "off" period of the transistor 23 is kept within acceptable limits.

When the transistor 155 is switched "on", it provides a path in parallel with the feedback resistor 42 to feed energy from the output of the switching transistor 23 back to its input.

The principal function of the trigger circuit 55, that of coupling a trigger pulse from node X to the base of transistor 23, is accomplished by a control transistor 152 whose emitter-collector circuit is connected between the base of switching transistor 23 and the ground line 22 so as to turn the switching transistor 23 "off" as the control transistor 152 is turned "on". The base of the control transistor 152 is connected through the coupling capacitor 45 to the output node X of the circuit 25.

The switching transistor 23, whose function is periodically to connect terminal 1 of the transformer 26 to the negative terminal of the battery 13', is aided in its switching function by another transistor 154, whose emitter-collector path is connected in parallel with that of the output switching transistor 23. But, whereas the output switching transistor 23 is controlled by the voltage which is switched from the node X through the coupling capacitor 45 and through the control transistor 152 to its base as well as by the currents which are fed back from the transformer 26 through the feedback resistor 42 and the transistor 155, the switching transistor 154 is controlled exclusively by the voltage on the node X through an input transistor 151 which is connected to control an additional transistor 153, whose output, in turn, is connected to control the second switching transistor 154.

The input transistor 151 is connected across lines 20 and 22 through a resistor 161, connected to its emitter, and through a pair of resistors 159 and 157, connected in series between its collector and line 20. Transistor 153 is also connected across lines 20 and 22, its emitter being connected to line 20 and its collector being connected through a resistor 163 to line 22. The base of the control transistor 153 is connected to the node between resistors 157 and 159 in the collector circuit of the transistor 151 and the base of transistor 154 is connected to, and controlled by the voltage on, the collector of transistor 153.

Thus, a negative going voltage shift at node X serves, through transistors 151 and 153, to turn "on" transistor 154.

Figure 8:
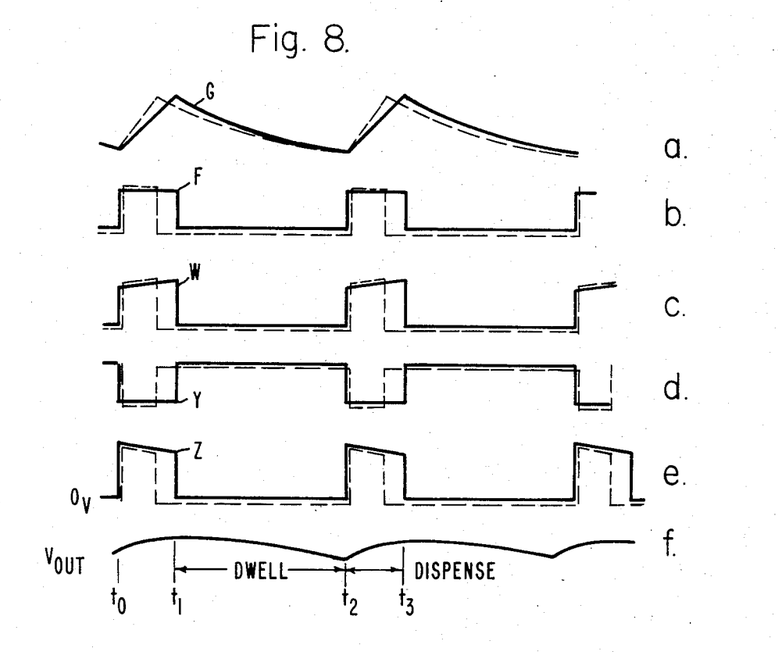
FIGS. 8a through d are waveforms illustrating the variation of voltages with time in the FIG. 6 circuit.

The manner in which the trigger circuit controls the operation of switching transistor 23 will next be described with reference to FIG. 8 over the period $t_0$ through $t_2$, with the explanation commencing at time $t_0$, just as the voltages at nodes W and X have risen from near ground level due to the timing capacitor 137 having been discharged to the point where the voltage at node G dropped below that of node F, at which point it will be recalled the transistors 111 and 119 are turned "on", raising the node W connected to the collector of transistor 119 to a level near $V_O$ prevailing on line 44.

The positive going pulse at node X is transmitted by the capacitor 45 to the base of transistor 152, causing it to turn "on". As a result, the collector of transistor 152 is pulled to ground, causing the switching transistor 23 to be cut off. Moreover, the sudden rise in voltage coupled by the capacitor 45 from node X to the emitter of transistor 151 causes that transistor to be cut off, whereupon the voltage on the base of transistor 153 rises, turning "off" that transistor as well. This, in turn, terminates current in the bias resistor 163, dropping the voltage on the base of transistor 154 so that this transistor, as well, is rendered nonconductive. At this time for reasons which will become apparent, the transistor 155 is nonconducting as well.

Thus, beginning with time $t_0$, both of the transistors which connect terminal 1 of transformer 26 to the ground line 22, namely, transistors 23 and 154, are nonconductive. It is during this time, which persists until $t_1$, that energy previously stored in the coil 19 of transistor 26 is discharged through the now forward biased diode 21 into the capacitor 17, as previously explained with reference to FIG. 2. This set of conditions continues until time $t_1$ when, as explained previously, the charge cycle of the timing capacitor 137 ends and the node W suddenly drops in voltage back to near zero due to the conduction in transistors 113 and 121 and cutting off of the transistor 119. When this occurs, the negative going pulse on node W is coupled through transistors 147, 149 and the coupling capacitor 45 to the base of transistor 152 and to the emitter of transistor 151, causing transistor 152 to turn "off" and transistor 151 to turn "on". This reverses the states of transistors 153 and 154 so that they are both turned "on".

Current drawn at time $t_1$ by transistor 154 through the node Z from the coil 19 causes the potential on pin 1 of transformer 26 to drop, which in turn causes, by transformer action, the potential on pin 3 of the transformer to rise. This voltage rise drives a bias current through the feedback resistor 42 into the base of switching transistor 23 and also causes, through increased voltage on the emitter of transistor 155, to turn "on" that transistor and, through that transistor, to furnish additional base drive current to switching transistor 23. As a result of these base drive currents, all occuring substantially at time $t_1$, the switching transistor 23 is turned "on", firmly pulling the voltage on node Z to ground, completing the action in that direction begun by the control transistor 154.

With the node Z firmly connected to ground through the transistors 154 and 23, the diode 21 becomes reverse biased and the circuit assumes the condition illustrated in FIGS. 3a and 3b, wherein current is driven from the battery 13' through the coil 19 and the transistors 23 and 154 as shown in FIG. 3a and current is supplied to the load resistor 15 through the output terminals 12 and 14 by the capacitor 17. During this period of time, which extends between $t_1$ and $t_2$, energy is built up in the coil 19 while being discharged by the output capacitor 17 into the load 15. As the electrical energy stored in capacitor 17 is being discharged into the resistor 15, the voltage across output terminals 10 and 12 gradually drops. The above process is terminated at time $t_2$, which marks the instant when the timing capacitor 137 has discharged sufficiently through the resistor 131 and the transistors 141 and 143 to drop the voltage at node G to a level which is below that being maintained at node F on the base of transistor 111.

It will be recalled that, while the capacitor 17 was discharging into the load resistor 15, the timing capacitor 137 was being discharged through the timing resistor 131. At time $t_2$, then, the oscillator and pulse width modulating circuit 25 reverts to the condition which had prevailed at time $t_0$, marking the beginning of the next charging cycle of the timing capacitor 137, a time period which lasts until time $t_3$, a period during which the switching transistor 23 and its associated control transistor 154 are again turned "off" and energy in the coil 19 is again dispensed through the forward biased diode 21 into the output capacitor 17, causing the voltage across the capacitor, and hence across the output terminals 12, 14, to rise as shown in FIG. 8f.

Thus, the trigger circuit 55, the switching transistor 23, and the diode 21 serve in conjunction as a switching circuit for alternately connecting the coil 19 across the battery 13' and, in series with that battery, across the output capacitor 17.

To see how the circuit 41 serves to maintain a constant voltage across the output terminals 12 and 14, notwithstanding changes in the voltage $V_B$ across input terminals 8 and 10, let it be assumed again that such a voltage change occurs and that the voltage $V_B$ decreases. The resulting changes in the voltages throughout the circuit are illustrated by dashed lines in FIG. 8. Thus, the voltage rise across lines 22 and 44 is reflected by a change in the voltage level at node D of the sense amplifier 27, increasing the level of current drawn by transistor 101 relative to that drawn by its associated transistor 103, both in the sense amplifier 27. The increased $I_{O2}$ current through transistor 101 provides an additional charging current over the line 109 to the timing capacitor 137 during the time period $t_0$-$t_1$, causing that capacitor to be charged more rapidly and hence to advance the time when charging of the timing capacitor 137 is completed. Consequently, the voltage $V_O$ to which the potential across the output capacitor 17 rises during the dispense periods such as $t_0$-$t_1$ and $t_2$-$t_3$, is higher, since the coil dwell time ($t_1$-$t_2$) is extended, resulting in an increase in the energy stored in the coil 19 for subsequent transfer to the capacitor 17. This voltage rise continues until the voltages $V_R$ and $V_S$ at nodes A and D of the sense amplifier 27 match, reflecting that the voltage $V_O$ across output terminals 12 and 14 has returned to the level dictated by the reference voltage on node A.

In the foregoing description of the circuit 41 of FIG. 6 it was assumed that, through the initial voltage buildup cycles of the circuit as described briefly with reference to FIG. 5, sufficient voltage had been developed across the lines 22 and 44 to enable operation of the circuits 53, 27 and 25. Now, that the circuitry necessary to accomplish this buildup has been described, the manner in which the buildup takes place will be explained. When a voltage is initially applied to the circuit terminals 8 and 10 by means of the battery 13', as by closing a switch (not shown), the transistor 23 is switched into conduction by the voltage applied to its collector and base by terminals 1 and 3 of the transformer 26. As a result, coil 19 of the transformer 26 is connected through the transistor 23 across the battery 13', storing energy in the coil until the transistor is cut off, which occurs when the core of the transformer 26 becomes saturated, causing the base current to the transistor 23 to terminate.

At this time, the state of the circuit changes to that depicted in FIG. 2, in which the diode 21 becomes forward biased and current flows from the coil 19 through the capacitor 17 and through the load resistor 15. This continues until the transistor 23 is turned "on" again, which occurs when the energy stored in the coil 19 has been discharged. In this manner the blocking oscillator circuit comprising the output circuit 47 and the resistor 42 and transistor 155 alternates between the two states illustrated in FIGS. 2, 3a and 3b, with each alternation increasing the voltage across the capacitor 17 by virtue of the voltage across the coil 19 being placed in series with the voltage across the battery terminals 8 and 10. This continues until the voltage across the capacitor 17 reaches the level where the circuits 51, 53, 27, and 25 receive sufficient voltage over the lines 22 and 44 to commence operation in the steady state mode described previously.

The exemplary circuit of FIG. 6 was built and used successfully to produce a regulated output voltage $V_O$ to 5 volts with an input voltage $V_B$ varying between 0.9 volts and 1.5 volts. The current drawn by the circuit of FIG. 6 in the absence of an external load across the output terminals 12 and 14 was 2.5 milliamps.

The low current drain of the FIG. 6 circuit was due partly to the use of an integrated circuit for most of the components of the FIG. 6 configuration. Thus, with the exception of output switching transistor 23, which in the actual circuit that was built was a standard type 2N2222 transistor, all of the other transistors in the circuit were embodied in a semi-custom bipolar integrated circuit made by Micro-Circuits Engineering, Inc. (MCE) of West Palm Beach, Florida and sold under its Model No. A20G. Similarly, all of the resistors shown in FIG. 6 (except for the trimming resistor 100) were embodied in that integrated circuit, including the feedback resistor 42 shown in FIG. 6 as being a part of the block 47. The only other major components of the circuit external to the integrated circuit were the transformer 26, the capacitors 17, 45 and 137, and the diodes 21 and 170. The precise values of the resistors and capacitors and of the coils of transformer 26 are listed in the following Table.

TABLE

| Resistors | Value In Ohms | Resistors | Value In Ohms |
|---|---|---|---|
| 37 | 18K | 131 | 15K |
| 42 | 450 | 133 | 7.2K |
| 63 | 120K | 135 | 200 |
| 69 | 3.6K | 145 | 7.2K |
| 71 | 75 | 157 | 3.6K |
| 97 | 10.8K | 159 | 900 |
| 99 | 10.8K | 161 | 7.2K |
| 100 | 10K | 163 | 3.6K |
| 105 | 1.35K | 165 | 100 |
| 115 | 7.2K | 167 | 1.5K |
| 117 | 7.2K | 169 | 900 |
| 123 | 3.6K | | |
| 129 | 15K | | |

| Capacitors | |
|---|---|
| 17 | 47 μF |
| 45 | .0047 μF |
| 137 | 750 pF |

| Coils | |
|---|---|
| 19 | 2 mH |
| 43 | 2 mH |

In the integrated circuit illustrated in FIG. 6, each of the following symbols identify a set of transistors, ganged in parallel for added power, the number of transistors in each set being as indicated.

83: X2
152: X2
153: X4
154: X2
155: X4

In summary, there has been described an improved DC-to-DC voltage converter circuit (41) in which a first coil (19) is alternately connected by means of an electronic control circuit (circuits 51, 27, 25, 55, transistor 23, and diode 21) across a source of DC potential (13') and in series with that source across an output capacitor (17) so as to generate across the capacitor a voltage greater than that of the DC potential. An electronic switching circuit (circuit 55, transistor 23 and diode 21) within the control circuit effects the alternate connections of the coil (19) which is electromagnetically coupled to a second coil (43). The second coil is connected to the switching circuit so as to create a blocking oscillator to open and close a path through the switching circuit once during each operating cycle of the oscillator. There is thus generated a voltage across the capacitor, which is applied to the circuits 51, 27 and 25 of the voltage converter circuit 41 to serve as its operating potential.

What is claimed is:

1. In a DC-to-DC converter of the type having a first coil alternately connected by means of an electronic control circuit across a source of DC potential and in series with said source across an output capacitor so as to generate a voltage across said capacitor greater than that of said DC potential, said electronic control circuit including an electronic switching transistor connected to said first coil, the improvement comprising:
  (a) a second coil electromagnetically coupled to said first coil and forming therewith a single center tapped transformer terminating in first and second end taps;
  (b) means for electrically connecting said transformer at its center tap to said source of DC potential, at one end tap to the collector of said switching transistor and at the other end tap to the base circuit of said switching transistor, so as to create a blocking oscillator comprising said switching transistor and said coils, wherein a current conducting path in said electronic switching transistor is opened and closed during each operating cycle of said oscillator so as to initiate generation of said voltage across said capacitor; and
  (c) means for applying the voltage developed across said output capacitor to said electronic control circuit to serve as its operating potential during circuit start-up and thereafter.

2. The improvement of claim 1 characterized further in that said means for applying the voltage developed across said output capacitor comprises a direct connection from said output capacitor to said control circuit.

3. The improvement of claim 1 characterized further in that said one end tap of said center tapped transformer is connected directly to said output capacitor through a diode.

* * * * *